Figure 1:
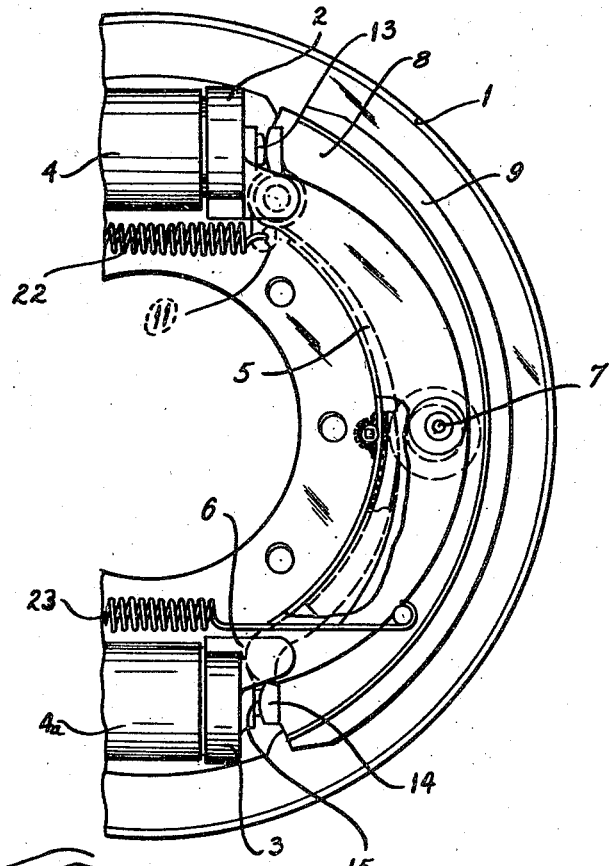

Dec. 30, 1947.   S. SCHNELL   2,433,487
ADJUSTING MEANS FOR BRAKE SHOES
Filed June 14, 1945

INVENTOR:
STEVE SCHNELL

BY *E. S. Huffman*
ATTORNEY.

Patented Dec. 30, 1947

2,433,487

UNITED STATES PATENT OFFICE 2,433,487

ADJUSTING MEANS FOR BRAKE SHOES

Steve Schnell, Kirkwood, Mo., assignor to Wagner Electric Corporation, St. Louis, Mo., a corporation of Delaware Application June 14, 1945, Serial No. 599,425

9 Claims. (Cl. 188—79.5)

This invention relates to a two-forward shoe brake assembly and in its more specific aspects is directed to a means for manually adjusting the brake shoe radially of the brake assembly.

One of the objects of the invention is to provide a manually operable adjusting means for each of the brake shoes of a two-forward shoe brake in which each brake shoe is received by a member to which it is relatively movable and radially adjustable.

Another object of the invention is to provide a manually operable adjusting means for a brake assembly in which there is a two-part shoe, one part of which is radially fixed, with means provided between said part and the shoe for radially adjusting the shoe with respect to the brake assembly.

Figure 2:
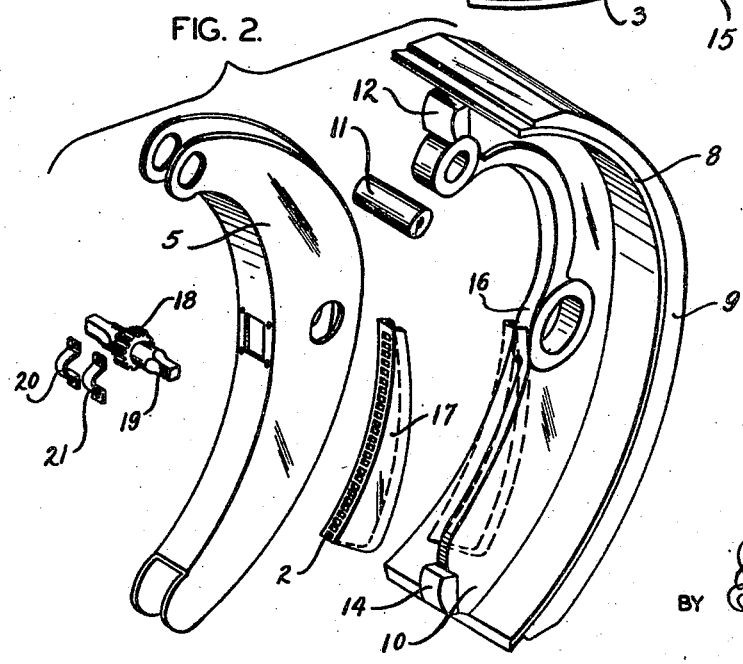

In the drawings:

Figure 1 shows an elevational view of a portion of the brake assembly incorporating the invention; and Figure 2 shows an exploded view of the adjusting means in the shoe assembly.

This invention is an improvement over the disclosure set forth in copending application Serial No. 590,579, filed April 27, 1945, and is directed to a means for adjusting the shoe relative to the channel member with which the shoe cooperates to enable the shoe to be adjusted radially of the brake assembly to compensate for wear of the friction element.

The brake assembly comprises a conventional backing plate 1 on which abutment elements 2 and 3 are mounted, each of which is constructed in accordance with the corresponding elements shown in the above identified application. Brake cylinders 4 and 4a are received in abutment elements 2 and 3 in such a way that they have movement relative thereto in order to float in said abutments as more specifically set forth in said application. A channel member or lever 5 is disposed between the two abutment elements, one end of which is received in a slot formation on abutment 2 and the other end of which is engageable with a radial abutment surface 6 formed on abutment 3. The channel member 5 is capable of limited circumferential movement but its radial position with respect to the brake assembly is fixed by reason of being placed in the slot formed in the fixed abutment 2 and by resting against the radial surface 6 on abutment 3. To prevent tipping of the shoe and channel assembly, a steady rest or guide in the form of a bolt 7 conventional in the art and illustrated in detail in the above identified application associates the shoe and channel assembly with the backing plate.

The brake shoe 8 has a friction lining 9 provided thereon and has a web portion 10 which is received in channel member 5. Shoe 8 and channel member 5 are pivoted together at one end by a pin 11, which pivoted end of the shoe and channel member is received within the slot in abutment 2. The shoe has an enlargement 12 thereon with which the piston rods 13 of brake cylinder 4 are engageable in order to urge the brake shoe and its lining into engagement with a brake drum (not shown). The opposite or lower end of the shoe is provided with another enlargement 14 with which one of the piston rods 15 of brake cylinder 4a is engageable to urge the brake shoe into engagement with the brake drum. It is understood that brake cylinder 4a is employed during the forward motion of the drum and brake cylinder 4 is employed during the reverse motion of the drum. The brake thrust is absorbed in abutment 2 in the forward direction through the shoe, and the channel member absorbs the brake thrust on the radial surface 6 during the reverse direction of operation. The operation of the complete assembly is detailed in the above identified application.

The shoe 8 has a bossed portion 16 formed in web 10 with which the steady rest or bolt 7 is associated. This enlargement is operative in connection with the adjusting mechanism provided whereby the clearance between the friction lining 9 and the drum (not shown) is adjusted to compensate for wear on lining 9. A U-shaped substantially circularly contoured wedge member 17 rests against the base of channel member or lever 5. The web member 10 of brake shoe 8 is received in the channel of member 17 with the narrow portion of member 17 engaging the boss or enlargement 16 on web 10. When wedge member 17 is moved upwardly, as viewed in Figures 1 and 2, it will move shoe 8 radially outward of the brake assembly by swinging the unpivoted end of the shoe about pin 11 to thereby vary the clearance between lining 9 and the cooperating brake drum. Since channel member 5 is radially fixed with respect to the assembly, it follows that when wedge member 17 is moved along the base of member 5 the clearance between the shoe and the channel member, as well as the brake drum, will thereby be altered depending upon the direction of circumferential motion of wedge member 17.

The mechanism for imposing a circumferential motion on wedge member 17 comprises a gear and shaft member 18, the ends of the shaft being squared for the receipt of a suitable wrench. The wrench may be inserted through an appropriate aperture in backing plate 1 to thereby engage one of the squared ends 19 of member 18 to enable the adjustment to be performed without disassembly of the wheel and brake mechanism. A pair of bracket members 20 and 21 surround the shaft of member 18 adjacent the gear element and holds member 18 in position on lever or member 5. These brackets are formed from spring material and are shaped in a manner with respect to gear element 18 to act as a brake thereon to prevent unintentional rotation thereof to thereby hold the gear element 18 and channel member 17 in any adjusted position. The closed or base portion of the U-shaped channel member 17 has a gear rack 17' formed therein in which the teeth are preferably formed as apertures. The gear on member 18 meshes with the gear rack 17' on member 17. The rotation of member 18 circumferentially moves the wedge member 17 to thereby radially adjust shoe 8. Springs 22 and 23, associated with brake shoe 8, are engageable with the ends of the complemental brake shoe (not shown) and urge the channel member or lever 5 and the brake shoe into engagement with the abutment elements 2 and 3.

Having fully described my invention, that which I claim as novel and desire to protect by Letters Patent of the United States is:

1. In a brake assembly, a backing plate; a pair of abutment elements substantially diametrically disposed on said backing plate; a shoe member and a lever member, one end of said shoe pivoted to one end of said lever, said pivoted ends operatively disposed in said abutment members, the unpivoted ends of said shoe and said lever movable relative to each other, said shoe having a boss on its web member; an adjusting member disposed between said lever member and said shoe, said adjusting member engageable with said boss and movable longitudinally of said lever; and manually operable means to circumferentially move said adjusting member to rotate the unpivoted end of said shoe to thereby vary the radial position of said shoe with respect to said brake assembly.

2. In a brake assembly, a pair of abutments disposed at substantially diametrically opposite positions on a backing plate; a brake shoe including a web portion having an enlargement thereon; a lever member, one end of said shoe pivoted to one end of said lever, the pivoted ends of said shoe and said lever member operatively associated with one of said abutments; means disposed between said lever member and said shoe capable of circumferential movement with respect thereto and engageable with said enlargement to vary the radial position of said shoe with respect to said brake assembly; and manually operable means to circumferentially move said adjusting member along said lever.

3. In a brake assembly, a backing plate; a pair of abutment elements disposed at substantially diametrically opposite positions on said backing plate; a shoe having a web portion and an adjustment engaging surface thereon; a lever element; means to pivot said shoe and said lever element together; an adjusting member disposed between said lever member and said shoe engageable with said adjustment engaging surface; and manually operable means to move said adjusting member with respect to said shoe along said lever to thereby vary the radial position of said shoe with respect to said brake assembly.

4. In a brake assembly, a backing plate; a pair of abutment elements mounted on said backing plate in substantially diametrically opposite positions; a shoe member having an adjustment engaging member thereon; a channel element; a channel element; means pivoting said channel element to said shoe; an adjusting means disposed in said channel element engageable with said member; a gear mechanism rotatably mounted on said channel element, said adjusting member having a tooth formation therein engageable with said gear; and said adjusting member movable relatively to the boss on said shoe in order to adjust the radial position of said shoe with respect to the brake assembly.

5. In a brake assembly, a backing plate; two abutment elements substantially diametrically mounted on said backing plate; a brake shoe; an element receiving said shoe and pivoted thereto, said element and said shoe operatively associated with said abutment elements, said shoe having a boss thereon; an adjusting member engageable with said boss and operable between said shoe and said member, said adjusting member having a tooth formation therein; and gear means mounted on said element engageable with said tooth formation to change the circumferential position of said adjusting member to thereby vary the radial position of said shoe with respect to said assembly.

6. In a brake assembly, a backing plate; a braking device comprising a shoe member and a lever member pivoted together at one end thereof; means to support said device on said backing plate; and means to adjust said shoe relatively to said lever comprising a circumferentially movable adjusting member disposed between said shoe and said lever and manually operable means engaging said adjusting member to vary the position thereof with respect to said shoe and said lever.

7. A brake assembly comprising a brake shoe; a lever; means to pivot one end of said lever to one end of said shoe, the other ends of said shoe and lever being unpivoted; a member arranged between the unpivoted ends of said lever and said shoe to adjust the unpivoted end of said lever with respect to said shoe; and means to longitudinally move said member along said lever.

8. A brake assembly comprising a brake shoe; a lever having the same general shape as said shoe; means to pivot one end of said lever to one end of said shoe, the other ends of said shoe and lever being unpivoted; a wedge arranged between the unpivoted ends of said lever and said shoe to adjust the unpivoted end of said lever with respect to said shoe; and means to longitudinally move said wedge along said lever.

9. A brake assembly comprising a backing plate; a brake shoe; a lever; means to pivot one end of said lever to one end of said brake shoe, the other ends of said shoe and said lever being unpivoted; means to support said pivoted ends on said backing plate; means arranged between said lever and said shoe; and manually operable means to move said last mentioned means toward and away from said pivoted ends of said lever and shoes to move the unpivoted end of said lever relative to the unpivoted end of said shoe to thereby adjust said shoe radially with respect to said backing plate.

STEVE SCHNELL.

REFERENCES CITED

The following references are of record in the file of this patent:

UNITED STATES PATENTS

| Number | Name | Date |
| --- | --- | --- |
| 1,779,197 | Stoner | Oct. 21, 1930 |
| 1,888,691 | Pearson | Nov. 22, 1932 |
| 1,898,108 | White | Feb. 21, 1933 |
| 2,400,468 | Sacher | May 14, 1946 |